United States Patent
Yamada et al.

(10) Patent No.: US 9,440,265 B2
(45) Date of Patent: Sep. 13, 2016

(54) CONVEYING CONTROLLING APPARATUS, CONVEYING CONTROLLING METHOD AND PROGRAM

(71) Applicant: CANON KABUSHIKI KAISHA, Tokyo (JP)

(72) Inventors: Daisuke Yamada, Kawasaki (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/815,778

(22) Filed: Jul. 31, 2015

(65) Prior Publication Data
US 2016/0031653 A1    Feb. 4, 2016

(30) Foreign Application Priority Data

Aug. 4, 2014 (JP) ................................. 2014-158705

(51) Int. Cl.
| | |
|---|---|
| B07C 5/34 | (2006.01) |
| B65G 43/08 | (2006.01) |
| G01B 11/24 | (2006.01) |
| G05B 19/418 | (2006.01) |

(52) U.S. Cl.
CPC ............. B07C 5/3404 (2013.01); B65G 43/08 (2013.01); G01B 11/24 (2013.01); G05B 19/4182 (2013.01); *Y02P 90/02* (2015.11)

(58) Field of Classification Search
CPC ...... B07C 5/3404; B07C 5/342; B65G 43/08
See application file for complete search history.

(56) References Cited

U.S. PATENT DOCUMENTS

| | | | | |
|---|---|---|---|---|
| 3,969,228 A | * | 7/1976 | Browning | B07C 5/3404 |
| | | | | 209/523 |
| 5,248,102 A | * | 9/1993 | Bohn | B02C 19/0087 |
| | | | | 241/100 |

(Continued)

FOREIGN PATENT DOCUMENTS

| | | |
|---|---|---|
| JP | 2000-241141 A | 9/2000 |
| JP | 2001-022423 A | 1/2001 |

(Continued)

OTHER PUBLICATIONS

Alice Kirchheim, et al; "Automatic Unloading of Heavy Sacks From Containers;" Proceedings of the IEEE, International Conference on Automation and Logistics; Qingdao, China, Sep. 2008; pp. 946-951.

(Continued)

*Primary Examiner* — Thomas Randazzo
(74) *Attorney, Agent, or Firm* — Canon USA, Inc., IP Division

(57) ABSTRACT

To convey an object container so as to prevent the content thereof from being diffused, there is provided an information controlling apparatus which controls a robot conveying the object container, and comprises: a 3D shape measuring unit configured to measure the 3D shape of the object container; a state measuring unit configured to measure the state of the content of the object container; a conveying method determining unit configured to determine the conveying method for the object container by the robot based on the 3D shape measured by the 3D shape measuring unit and the state measured by the state measuring unit; and an action planning unit configured to control the action of the robot based on the conveying method determined by the conveying method determining unit.

9 Claims, 8 Drawing Sheets

(56) References Cited

U.S. PATENT DOCUMENTS

| | | | |
|---|---|---|---|
| 6,029,851 A * | 2/2000 | Jenkins | G07F 7/06 221/102 |
| 6,369,889 B1 * | 4/2002 | Olschewski | G01N 21/90 250/223 B |
| 6,522,777 B1 * | 2/2003 | Paulsen | G01B 11/2513 356/237.2 |
| 6,956,963 B2 * | 10/2005 | Ulrich | G01B 11/2513 257/E21.001 |
| 6,962,291 B2 * | 11/2005 | Guntveit | B07C 5/3412 235/462.14 |
| 8,418,830 B2 * | 4/2013 | Salamanca | B25J 9/0093 198/358 |
| 9,064,228 B2 * | 6/2015 | Woerz | G06Q 10/087 |
| 2005/0151841 A1 * | 7/2005 | Nelson | G01N 21/954 348/82 |
| 2011/0083943 A1 | 4/2011 | Zhang et al. | |
| 2015/0104563 A1 * | 4/2015 | Lowe | C09J 5/06 427/8 |

FOREIGN PATENT DOCUMENTS

| | | |
|---|---|---|
| JP | 2001-194318 A | 7/2001 |
| WO | 93/00618 A1 | 1/1993 |

OTHER PUBLICATIONS

Kazuo Takei; "Cargo Container X-Ray Inspection Systems," Hitachi Review, vol. 53 (2004), No. 2; pp. 97-102.

* cited by examiner

CONVEYING CONTROLLING APPARATUS, CONVEYING CONTROLLING METHOD AND PROGRAM

BACKGROUND OF THE INVENTION

1. Field of the Invention

The present invention relates to conveying controlling apparatus and method which control a conveying apparatus conveying an object, a program which is used to achieve the conveying controlling method, and a conveying system to which the conveying controlling apparatus and method are applicable. Incidentally, in the present application, it is assumed that "object", "object container" and "container" which appear in what follows are equivalent.

2. Description of the Related Art

When a conveying apparatus which conveys an object is used in a recycling process, how to convey the object by the conveying apparatus is generally determined by recognizing the shape of the object and checking the recognized shape and a database with each other. Here, Japanese Patent Application Laid-Open No. 2000-241141 discloses a 3D (three-dimensional) shape discriminating unit which checks a 3D shape measurement result with a database and thus selects a recycling procedure for a process object based on the checked result, and a recycling processing apparatus which uses the 3D shape discriminating unit.

Besides, Japanese Patent Application Laid-Open No. 2001-022423 discloses a conveying robot operation speed/acceleration speed optimizing method by which an apparatus having a conveyance-object positioning mechanism automatically determines optimum operation speed/acceleration speed of a conveying robot.

For example, in a case where a container containing contents is the object to be processed in the recycling process, even if the same-shape objects are conveyed in an object conveying operation, it is necessary to change the conveying method according to the state of the object such as a state that the contents have been adhered outside a container, a state that the amount of the contents is small, or the like. For example, in a toner cartridge recycling process, when a toner cartridge containing a toner as its content is conveyed, it is necessary to actually convey the toner cartridge such that the contained toner is not diffused.

However, it is difficult to automatically change the conveying method according to the state of the object. Therefore, under the circumstances, an operator has to convey the objects while visually confirming the objects themselves.

Incidentally, in regard to the recycling processing apparatus disclosed in Japanese Patent Application Laid-Open No. 2000-241141, any state of the object is not considered, and a worker actually scraps the objects. Besides, when the object is conveyed using the method disclosed in Japanese Patent Application Laid-Open No. 2001-022423, there is a fear that the contents of the object are diffused.

SUMMARY OF THE INVENTION

The present invention, which has been completed in consideration of such conventional problems as above, is characterized by a conveying controlling apparatus which controls a conveying apparatus conveying an object container and comprises: a shape measuring unit configured to measure a 3D shape of the object container; a state measuring unit configured to measure a state of a content of the object container; a determining unit configured to determine a conveying method for the object container by the conveying apparatus based on the 3D shape measured by the shape measuring unit and the state measured by the state measuring unit; and a controlling unit configured to control an action of the conveying apparatus based on the conveying method determined by the determining unit.

According to the present invention, it is possible to convey the object container so as to prevent the contents thereof from being diffused.

Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the attached drawings. Here, it should be noted that the following embodiments of the present invention do not limit the scope of application of the present invention.

First Embodiment

In the present embodiment, the 3D shape of an object and the state of the content (or the contents) of the object are first measured, then the part (or the parts), the location, the position (or the attitude) and the content of the object are decided based on the measured results, and the method of conveying the object is finally determined based on the decided results.

Here, the object is a hollow body which can contain therein the content. For example, a container such as a toner cartridge is treated as the object in the embodiments. The content is the matter to be contained in the object. For example, a toner to be contained in the toner cartridge is treated as the content in the embodiments. However, the content in the embodiments includes both the content contained in the object and the content existing outside the object.

Figure 1:
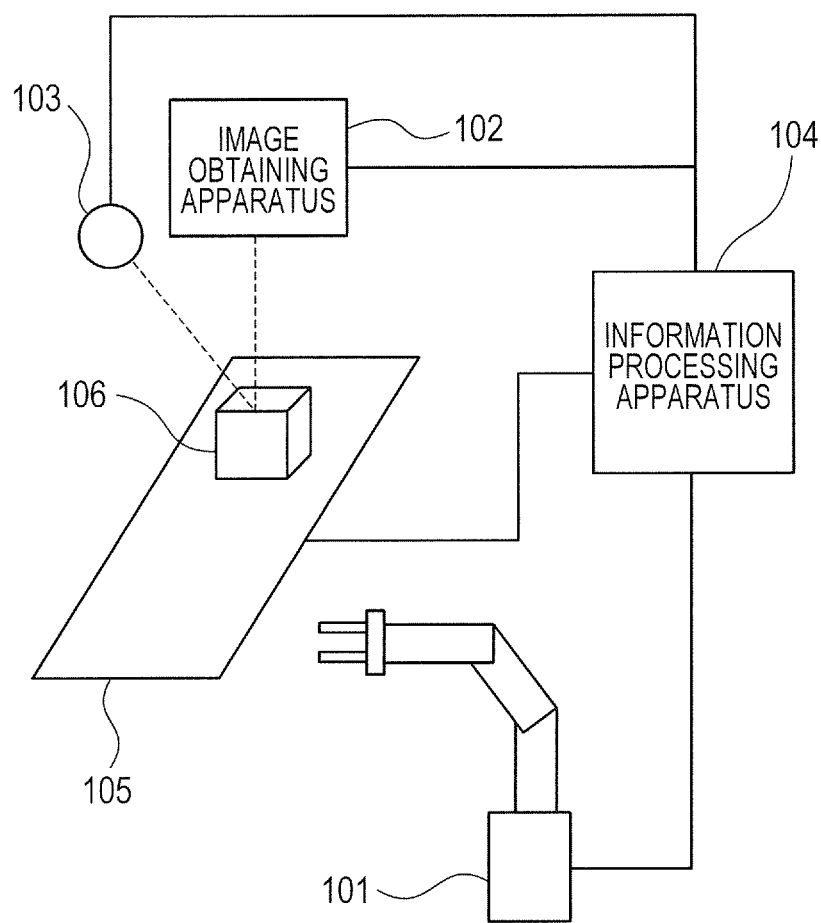
FIG. 1 is a diagram illustrating an example of the configuration of a conveying system according to the first embodiment.

FIG. 1 is a diagram illustrating an example of the configuration of a conveying system.

The conveying system includes a robot 101 serving as a conveying apparatus, an image obtaining apparatus 102, a light source 103, an information processing apparatus 104, and a transferring apparatus 105.

The robot 101 is, e.g., a manipulator, a robot hand or the like. The robot 101 performs the action determined by the information processing apparatus 104 to manipulate an object 106 set on the transferring apparatus 105. Here, the action is the operation of the robot 101 for manipulating the object 106. For example, the action includes the operation of the robot 101 for grasping and conveying the object 106 to a different location.

The image obtaining apparatus 102 is, e.g., a camera, a photosensor, a photodiode or the like. The image obtaining apparatus 102 obtains image information of the object 106 so as to measure the 3D shape and the state of the object 106. The image obtaining apparatus 102 outputs the obtained image information to the information processing apparatus 104.

The light source 103 is, e.g., a projector. The light source 103 illuminates the object 106 with uniform illumination or pattern light by projecting visible light or infrared light using a laser. Incidentally, a laser range finder consisting of the image obtaining apparatus 102 and the light source 103 may be used. Besides, the object may be measured passively by the two image obtaining apparatuses 102 without using the light source 103. Besides, the 3D shape and the state of the object 106 can be measured by only one image obtaining apparatus 102, the light source 103 is unnecessary.

The information processing apparatus 104, which functions as a conveying controlling apparatus, is constituted by, e.g., a calculator such as a computer and an auxiliary storage device such as a hard disk drive. The information processing apparatus 104, which is connected to the robot 101, the image obtaining apparatus 102, the light source 103 and the transferring apparatus 105 via interface devices, performs communication with each device and thus controls the action thereof. Besides, the information processing apparatus 104 stores therein information of the 3D shape and the state of the object 106, the working procedure of the robot 101 and the like.

In the present embodiment, the information processing apparatus 104 decides the 3D shape and the state of the object 106 and determines the conveying method by referring to the information stored in the information processing apparatus 104, based on the image information input from the image obtaining apparatus 102. Besides, the information processing apparatus 104 plans the action of the robot 101 by referring to the information stored in the information processing apparatus 104, and outputs the obtained plan to the robot 101.

The transferring apparatus 105 is, e.g., a belt conveyer. The transferring apparatus 105, of which the operation is controlled by the information processing apparatus 104, transfers the object 106 to the image obtainable range of the image obtaining apparatus 102.

The object 106, which is manipulated by the robot 101, is the object to which a recycling process is performed. The object 106 is, e.g., a toner cartridge in which a toner has been contained. In the present embodiment, the hollow body which can be filled with powder or liquid is assumed as the object.

Figure 2:
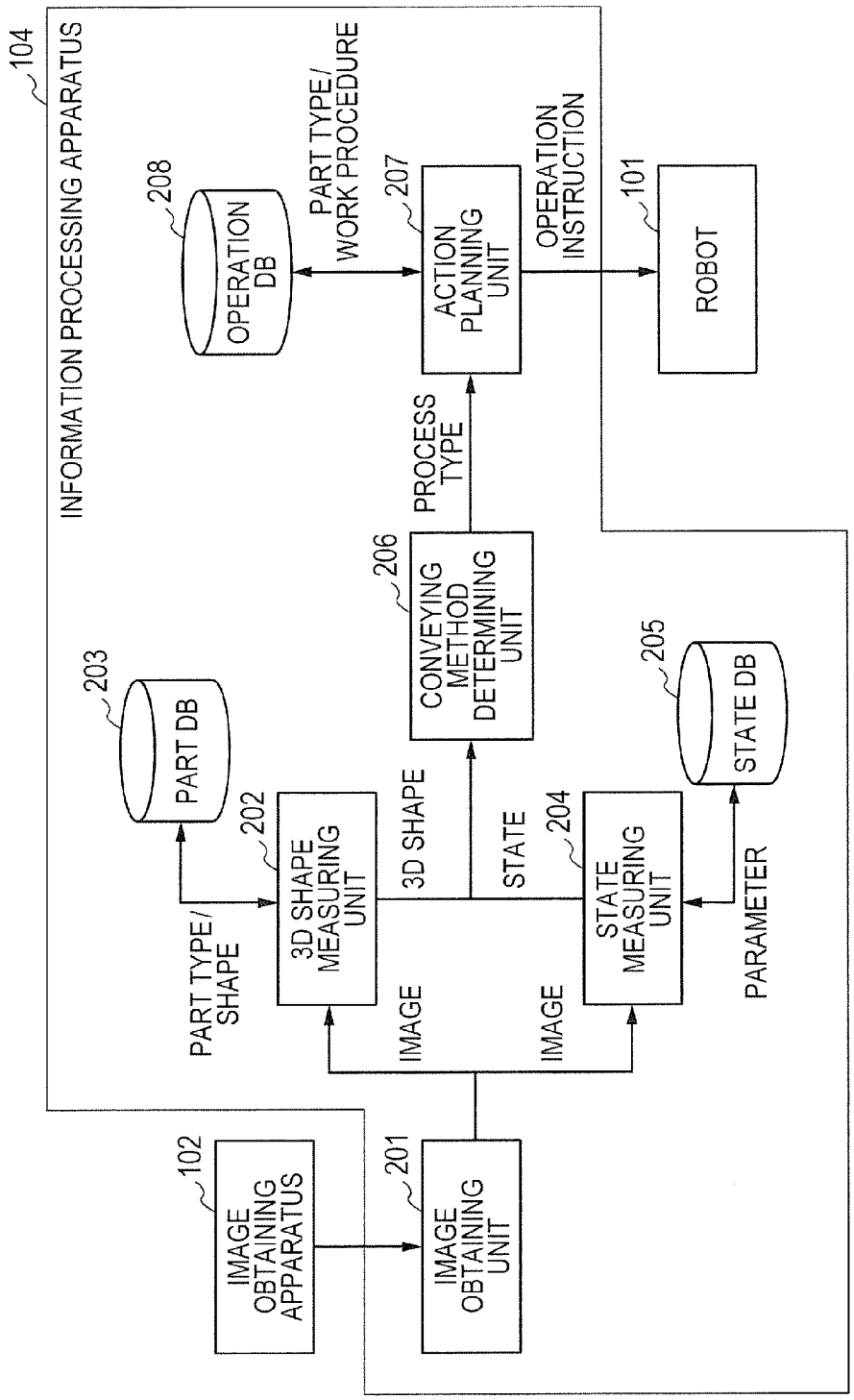
FIG. 2 is a block diagram illustrating a functional constitution of an information processing apparatus according to the first embodiment.

FIG. 2 is a block diagram illustrating a functional constitution of the information processing apparatus. Here, it should be noted that the functional constitution illustrated in FIG. 2 is achieved on the premise that a CPU (central processing unit) of the information processing apparatus 104 reads the program stored in, e.g., an ROM (read only memory) and expands the read program to a memory.

The information processing apparatus 104 includes an image obtaining unit 201, a 3D shape measuring unit 202, a part DB (database) 203, a state measuring unit 204, a state DB 205, a conveying method determining unit 206, an action planning unit 207, and an operation DB 208.

The image obtaining unit 201 is constituted by, e.g., a capture board and an RAM (random-access memory). The image obtaining unit 201 obtains the image information from the image obtaining apparatus 102, and outputs the obtained image information to the 3D shape measuring unit 202 and the state measuring unit 204.

The 3D shape measuring unit 202, which is an example of a shape measuring unit, recognizes the 3D shape of the object 106 based on the obtained image information. More specifically, the 3D shape measuring unit 202 determines the 3D shape of the object 106 by referring to the information of part type and shape stored in the part DB 203, and outputs the determined shape to the conveying method determining unit 206.

The part DB 203 stores therein the information of part type and shape of the object 106 to which the recycling process is performed. The 3D shape measuring unit 202 appropriately refers to the information in the part DB 203. Here, the data is the model data such as CAD (computer-aided design) data, CG (computer graphics) polygon data and the like.

The state measuring unit 204, which is an example of a state measuring unit, recognizes the state of the object 106 based on the obtained image information. More specifically, the state measuring unit 204 determines the state of the object 106 by referring to the parameter information stored in the state DB 205, and outputs the determined state to the conveying method determining unit 206.

The state DB 205 stores therein the parameter information of the object 106 to which the recycling process is performed, and the parameter information of the periphery of the object 106. The parameter information includes, e.g., a table showing the correspondence relation between the amount and the state of the content of the object 106, a table showing the correspondence relation between the degree of adhesion of the content to the outside of the object 106 and the state as to whether or not the content has been actually adhered outside the container, and a table showing the correspondence relation between the diffusion amount and the state of the content on the periphery of the object 106. The state measuring unit 204 appropriately refers to the information in the state DB 205.

The conveying method determining unit 206, which is an example of a conveying method determining unit, determines the conveying method of the object 106 based on the 3D shape information input from the 3D shape measuring unit 202 and the state information input from the state measuring unit 204. The conveying method determining unit 206 outputs the process type as the determined conveying method to the action planning unit 207.

The action planning unit 207, which is an example of a controlling unit, plans the action of the robot 101 based on process type input from the conveying method determining unit 206. More specifically, the action planning unit 207 plans the action of the object 106 by referring to the information of part type and work procedure stored in the operation DB 208. Then, the action planning unit 207 outputs the planned action plan as an operation instruction to the robot 101, and the robot 101 operations according to the operation instruction input from the action planning unit 207. Incidentally, the action planning unit 207 also controls the operations of the image obtaining apparatus 102, the light source 103 and the transferring apparatus 105 respectively connected to the information processing apparatus 104.

The operation DB 208 stores therein the information of part type and work procedure to be referred when the action planning unit 207 plans the action. That is, the action planning unit 207 appropriately refers to the information in the operation DB 208.

Figure 3:
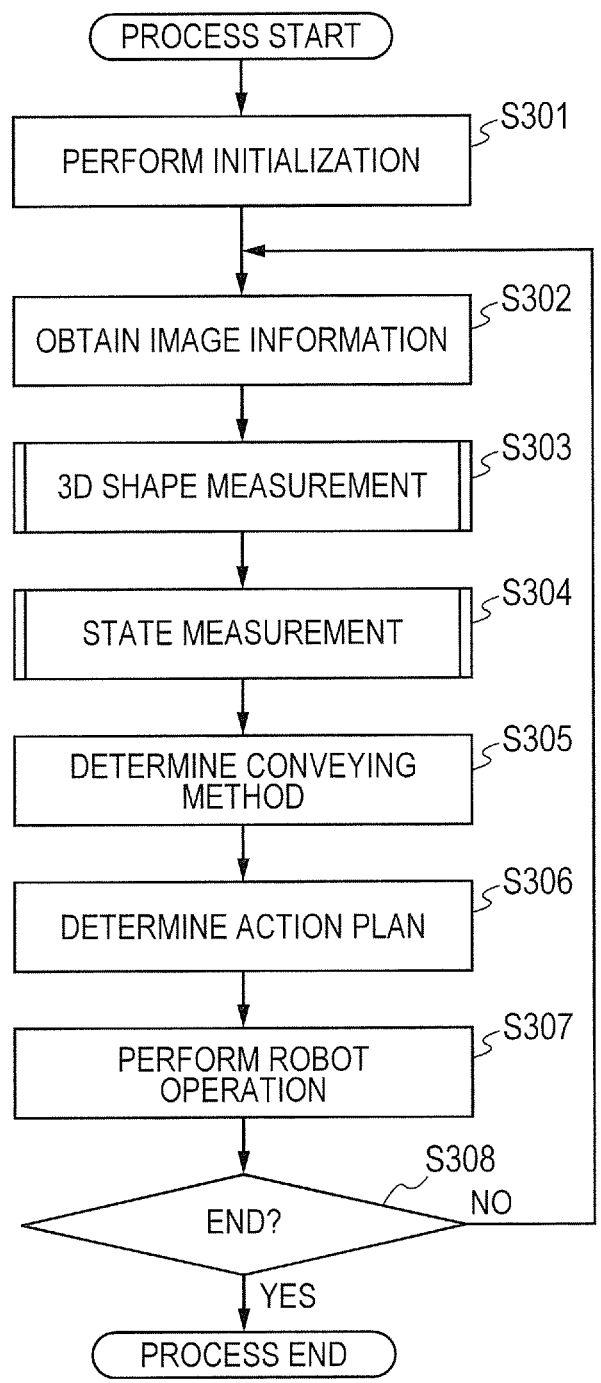
FIG. 3 is a flow chart indicating a process of the conveying system according to the first embodiment.

FIG. 3 is a flow chart indicating the process of the conveying system according to the present embodiment.

In S301, each apparatus or device of the conveying system performs initialization in response to activation of the conveying system by an operator. In the information processing apparatus 104, the CPU reads and expands the programs to the memory to enable various processes. Also, the robot 101 and the image reading apparatus 102 perform device parameter reading, return to the initial location, and the like to enable usable states.

In S302, the action planning unit 207 drives the transferring apparatus 105 to arrange and locate the object 106 within the image obtainable range of the image obtaining apparatus 102. The image obtaining unit 201 obtains the information related to the object 106, i.e., the image information, from the image obtaining apparatus 102.

In S303, the 3D shape measuring unit 202 performs the 3D shape measurement. Hereinafter, the process in S303 will be described with reference to a flow chart illustrated in FIG. 4.

Figure 4:
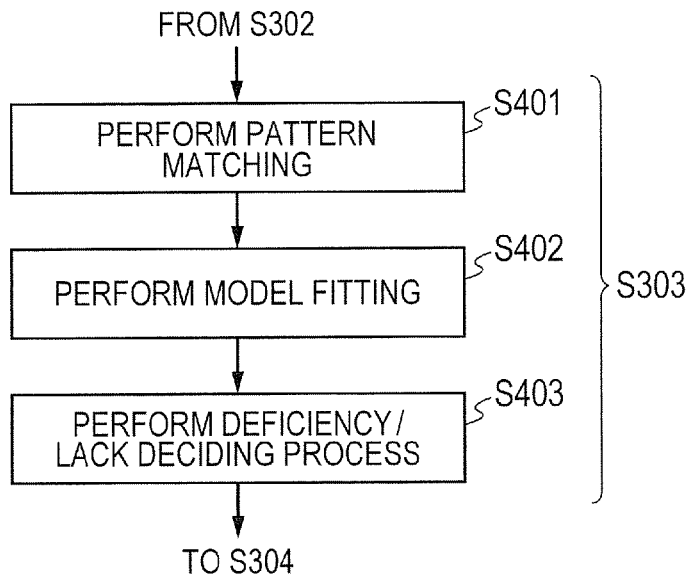
FIG. 4 is a flow chart indicating the process of the conveying system according to the first embodiment.

That is, FIG. 4 is the flow chart indicating the process to be performed in S303.

In S401, the 3D shape measuring unit 202 performs pattern matching of the object 106. More specifically, the 3D shape measuring unit 202 decides the part type of the object 106 by referring to the information in the part DB 203, based on the image information of the object 106. In a typical pattern matching method, for example, the pattern of the object 106 and the input image are compared with each other by correlation-based matching to estimate the most-similar location and position, and the part type of the object 106 is determined based on the estimated location and position. Incidentally, another pattern matching process by which the part type of the object 106 can be decided may be used.

In S402, the 3D shape measuring unit 202 performs model fitting of the object 106 based on the decided result. For example, the location and the position of the object 106 are measured by projecting, with use of uniform illumination, the object 106 onto a 2D (two-dimensional) image based on the edge of the object and the CAD data of the part DB 203. Alternatively, a range image on the surface is obtained by the IPC algorithm based on the location information of the measurement line by using the RC method or the DL method using pattern light, and thus the location and the position of the object 106 are measured.

In S403, the 3D shape measuring unit 202 performs a deficiency/lack deciding process of the object 106 based on the measured result. More specifically, the 3D shape measuring unit 202 partially performs matching-degree evaluation in the model fitting in S402, and, if there is no matching apparently, decides that there is a deficiency or lack at the relevant portion. This process corresponds to an example of the process to be performed by a deciding unit. Here, the lack implies a case where the object 106 lacks a part or parts.

After the process in S403, the process is advanced to S304 in FIG. 3.

In S304, the state measuring unit 204 performs state measurement. Hereinafter, the process in S304 will be described with reference to a flow chart illustrated in FIG. 5.

Figure 5:
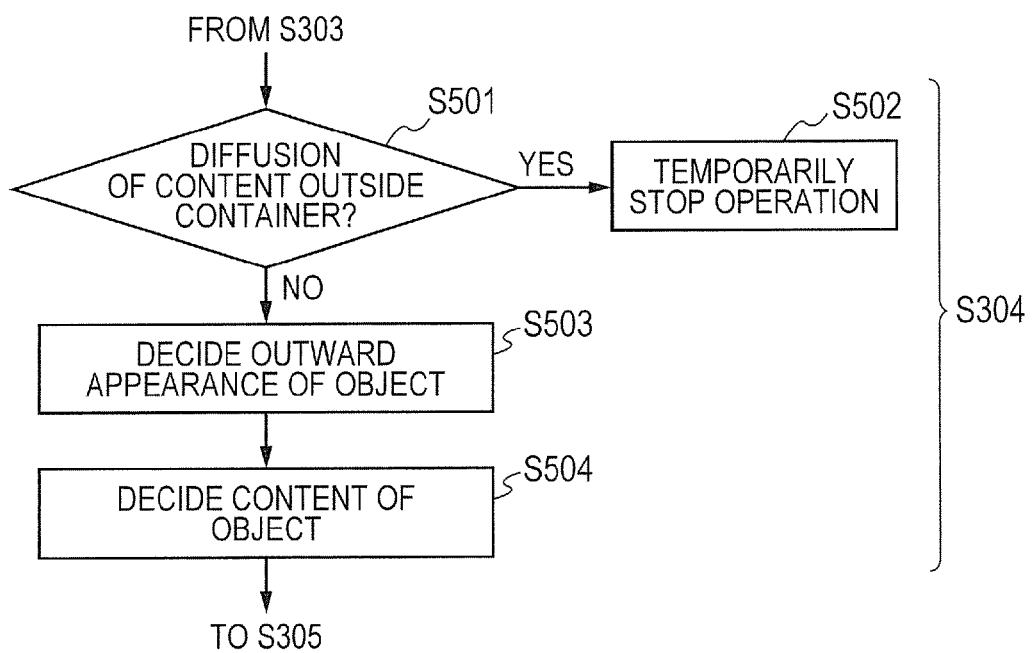
FIG. 5 is a flow chart indicating the process of the conveying system according to the first embodiment.

That is, FIG. 5 is the flow chart indicating the process to be performed in S304.

In S501, the state measuring unit 204 decides whether or not there is a diffusion of the content of the object 106 outside the container. More specifically, based on the image information of the periphery of the object 106, the state measuring unit 204 decides whether or not there is the diffusion of the content outside the container, by referring to the table showing the correspondence relation between the diffusion amount and the state of the content of the periphery of the object 106 stored in the state DB 205. If it is decided that there is the diffusion of the content outside the container, the process is advanced to S502 in which the action planning unit 207 temporarily stops the operation of the conveying system. Therefore, it is possible to prevent that the contents are excessively diffused outside the container. On the other hand, if it is decided that there is no diffusion of the content outside the container, the process is advanced to S503.

In S503, the state measuring unit 204 decides the outward appearance of the object 106. More specifically, based on the image information of the object 106, the state measuring unit 204 decides whether or not the content of the container has been adhered to the outside of the container and further decides the portion where the content has been adhered, by referring to the table, stored in the state DB 205, showing the correspondence relation between the degree of adhesion of the content to the outside of the object 106 and the state as to whether or not the content has been adhered.

In S504, the state measuring unit 204 decides the state of the content of the object 106. More specifically, based on the image information of the object 106, the state measuring unit 204 decides the amount of the content by referring to the table showing the correspondence relation between the amount and the state of the content of the object 106 stored in the state DB 205. This process corresponds to an example of the process to be performed by a content deciding unit.

After the process in S504, the process is advanced to S305 in FIG. 3.

In S305, the conveying method determining unit 206 determines the conveying method of the object 106 based on the results measured in S303 and S304. For example, it is assumed that it is decided in the deficiency/lack deciding process of S403 that there is a hole in the object 106 and it is decided in the object content deciding process of S504 that there is the content in the object. In this case, the conveying method determining unit 206 determines the conveying method of grasping and conveying the object 106 while covering the hole so as to not diffuse the content of the object 106, and outputs the determined conveying method to the action planning unit 207.

In S306, the action planning unit 207 determines the action plan of the robot 101 to achieve the determined conveying method.

In S307, the action planning unit 207 outputs the determined action plan to the robot 101. Therefore, the robot 101 performs the operation based on the action plan.

In S308, the image obtaining unit 201 decides whether or not the next object 106 exists on the transferring apparatus 105, based on the input image from the image obtaining apparatus 102. If it is decided that the next object 106 exists, the process is returned to S302 in which the information processing apparatus 104 repeats the above processes. On the other hand, if it is decided that the next object 106 does not exist, the process is ended.

According to the present embodiment, the 3D shape of the object 106 and the state of the content of the object 106 are measured, and the conveying method by the robot 101 is determined based on the measured results. For example, if it is decided that there is the hole in the object 106 and it is further decided that the content has been contained in the object 106, the action plan for achieving the conveying method of grasping and conveying the object 106 so as to cover the portion of the hole is output to the robot 101. Therefore, since the robot 101 grasps the object 106 according to the action plan, it is possible to convey the object so as to prevent the content from being diffused. Incidentally, in this case, the hand of the robot 101 may directly cover the hole, or the portion different from the hand of the robot 101 may cover the hole.

Moreover, since the 3D shape and the state of the object 106 are measured, for example, it is possible to cope with a case where a physical object for which the recycling process is not actually assumed is conveyed. In other words, it is possible to stop the conveying system when the unassumed physical object is conveyed.

Incidentally, when it is decided that there is the hole in the object 106, it may be possible to determine the conveying method of grasping and conveying the object 106 so as to cover the portion of the hole, irrespective of whether or not the content has been contained in the object.

Second Embodiment

In the first embodiment, when there is the hole in the object 106, the action plan is determined to achieve the conveying method of the object in which the hole is covered. In the present embodiment, it is possible, by changing the conveying speed of the robot 101 based on an amount of the content, to convey the object 106 as fast as possible while preventing the content from being diffused. That is, the amount of the content of the object 106 is first decided. Then, based on the decided amount of the content, the robot 101 is operated fast when the amount of the content is small, whereas the robot is operated slow when the amount of the content is large.

Figure 6:
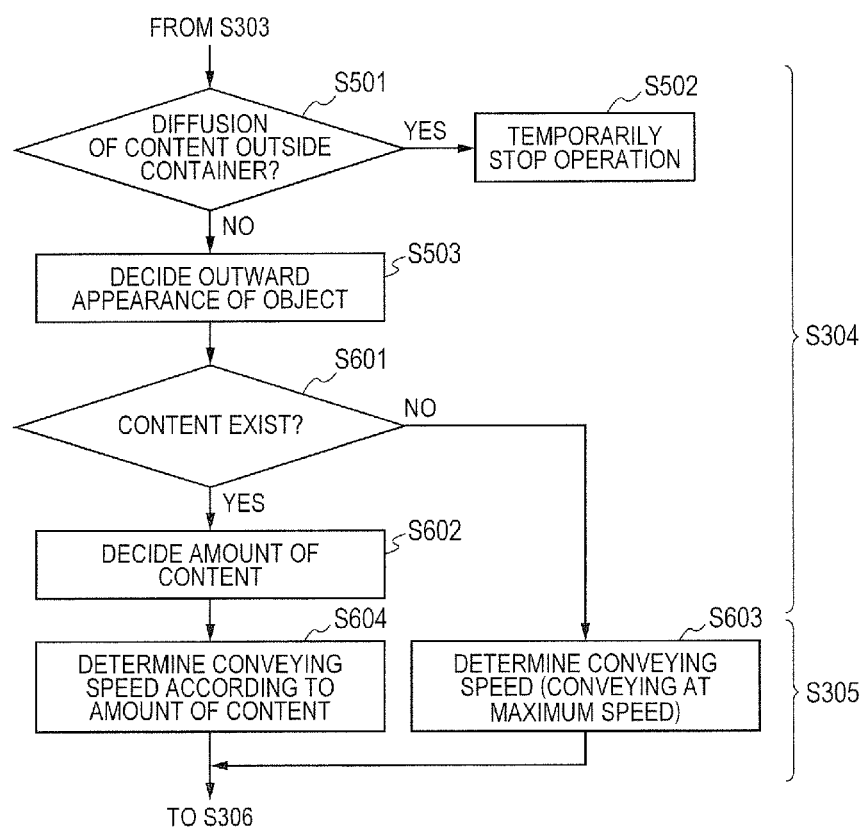
FIG. 6 is a flow chart indicating a process of the conveying system according to the second embodiment.

FIG. 6 is a flow chart indicating the process of the conveying system according to the present embodiment.

The process indicated by the flow chart in FIG. 6 corresponds to the state measuring process of S304 and the conveying method determining process of S305 respectively indicated in FIG. 3. Hereinafter, in the flow chart of FIG. 6, only the processes in S601 to S604 different from the process in the first embodiment will be described. Namely, the processes same as those in the first embodiment are indicated by the respective same step numbers, and the descriptions thereof will be omitted.

In S601, the state measuring unit 204 decides whether or not the content has been contained in the object 106. That is, based on the image information of the object 106, the state measuring unit 204 decides whether or not the content has been contained in the object 106, by referring to the table showing the correspondence relation between the amount and the state of the content of the object 106 stored in the state DB 205. Then, if it is decided that the content is not contained in the object, the object content deciding process is ended, and the process is advanced to S603. On the other hand, if it is decided that the content has been contained in the object, the process is advanced to S602.

In S602, the state measuring unit 204 decides the amount of the content of the object 106. In this step, it is decided what extent the amount of the content is, in comparison with the state that the amount of the content is zero. This process corresponds to an example of the process to be performed by an amount deciding unit. More specifically, based on the image information of the object 106, the state measuring unit 204 decides and confirms what extent the amount of the content contained in the object 106 is, by referring to the table showing the correspondence relation between the amount and the state of the content of the object 106 stored in the state DB 205. After the decision, the object content deciding process is ended, and the process is advanced to S604.

In S603, the conveying method determining unit 206 determines the conveying speed of the robot 101. In the present embodiment, the maximum speed at which the robot 101 conveys the object is determined by the conveying method determining unit 206 as the conveying speed. Then, the process is advanced to S306.

On the other hand, in S604, the conveying method determining unit 206 determines the conveying speed of the robot 101 according to the decided amount of the content of the object 106. That is, the conveying speed is determined so as to operate the robot 101 at high conveying speed when the amount of the content is small, whereas the conveying speed is determined so as to operate the robot at low conveying speed when the amount of the content is large. Then, the process is advanced to S306.

According to the present embodiment, the amount of the content of the object 106 is first decided. Then, as the decided amount of the content is smaller, the higher conveying speed is determined. In contrast, as the decided amount of the content is larger, the lower conveying speed is determined. Therefore, the conveying system will convey the object 106 as fast as possible while preventing the content of the object 106 from being diffused.

Third Embodiment

In the above first and second embodiments, the conveyance of the object is controlled in the case where the content exists within the container. However, in the present embodiment, a case where the content exists outside the container will be described. That is, in the present embodiment, in a case where the content has been adhered outside the object 106 (i.e., to the outside surface of the container), the object 106 is conveyed so as to prevent the adhered content from being diffused.

Figure 7:
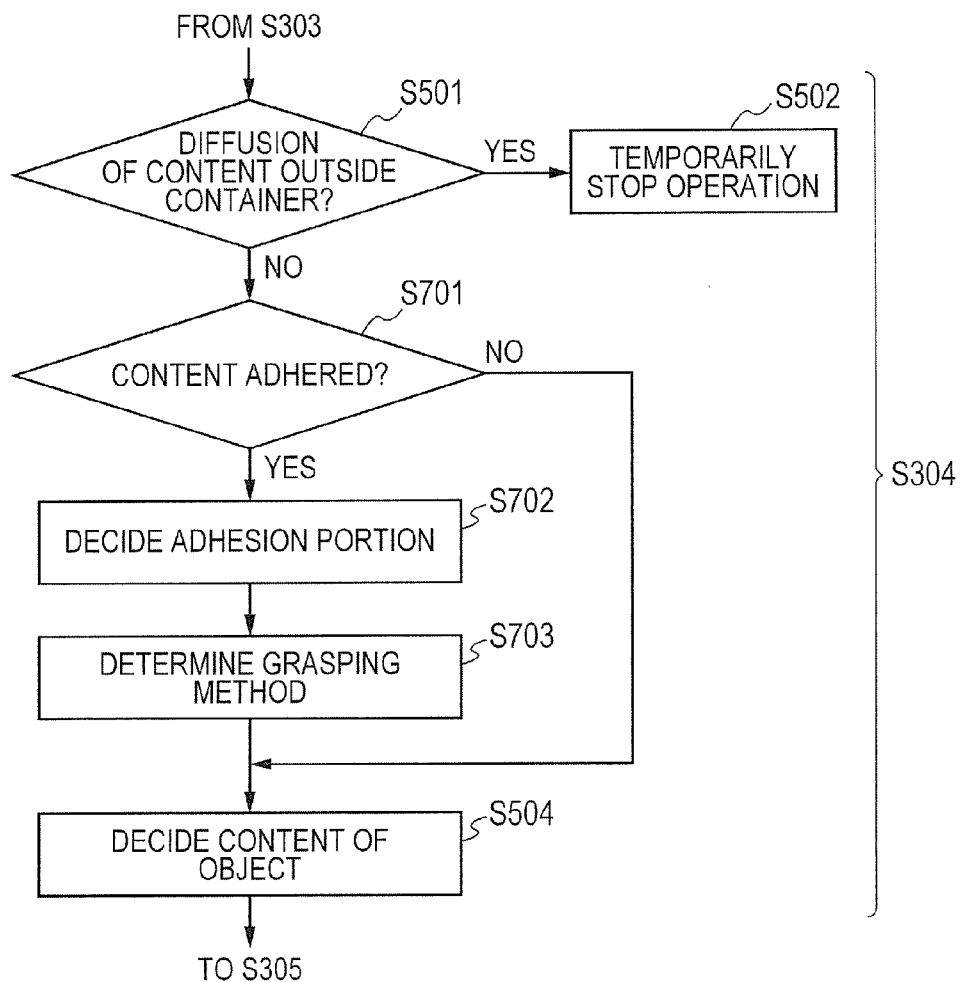
FIG. 7 is a flow chart indicating a process of the conveying system according to the third embodiment.

FIG. 7 is a flow chart indicating the process of the conveying system according to the present embodiment.

The process indicated by the flow chart in FIG. 7 corresponds to the state measuring process of S304 indicated in FIG. 3. Hereinafter, in the flow chart of FIG. 7, only an object outward appearance deciding process in S701 to S703 different from the process in the first embodiment will be described. Namely, the processes same as those in the first embodiment are indicated by the respective same step numbers, and the descriptions thereof will be omitted.

In S701, the state measuring unit 204 decides whether or not the content has been adhered outside the object 106 (i.e., to the outside surface of the container). This process corresponds to an example of the process to be performed by an adhesion deciding unit. Based on the image information of the object 106, the state measuring unit 204 decides and confirms whether or not the content has been adhered outside the object 106 (container), by referring to the table, stored in the state DB 205, showing the correspondence relation between the degree of adhesion of the content of the object 106 to the outside of the container and the state as to whether or not the content has been adhered. Then, if it is decided that the content is not adhered, the object outward appearance deciding process is ended, and the process is advanced to S504. On the other hand, if it is decided that the content has been adhered, the process is advanced to S702.

In S702, the state measuring unit 204 decides to which portion of the outside surface of the object 106 the content thereof has been adhered. More specifically, the state measuring unit 204 decides the adhesion portion by comparing the state that the content of the object 106 is not adhered outside the container with the state that the content has been adhered outside the container.

In S703, the conveying method determining unit 206 determines the grasping method. That is, the conveying method determining unit determines how the robot 101 grasps the object 106. For example, if it causes the robot 101 to grasp the object 106 so as to cover the adhesion portion of the content, it is possible to prevent that the content of the object 106 adhered outside the container is diffused. After the grasping method was determined, the object outward appearance deciding process is ended, and the process is advanced to S504.

According to the present embodiment, when the content of the object 106 has been adhered outside the container, it is possible, by grasping the object 106 so as to cover the adhesion portion of the content, to convey the object 106 while preventing the diffusion of the content adhered outside the container as much as possible.

Fourth Embodiment

The above first to third embodiments pay attention to the shape of the object 106, the amount of the content thereof, and the adhesion portion of the outside surface of the container to which the content has been adhered. The present embodiment pays attention to the position (attitude) of the object 106. Namely, in the present embodiment, it is possible to prevent a diffusion of the content, by causing the robot 101 to change the position of the object 106. That is, even if there is a possibility that the content is spilled by the position of the object 106, it is possible to prevent the content from being diffused, by conveying the object after changing the position thereof to the position by which the content is not spilled.

Figure 8:
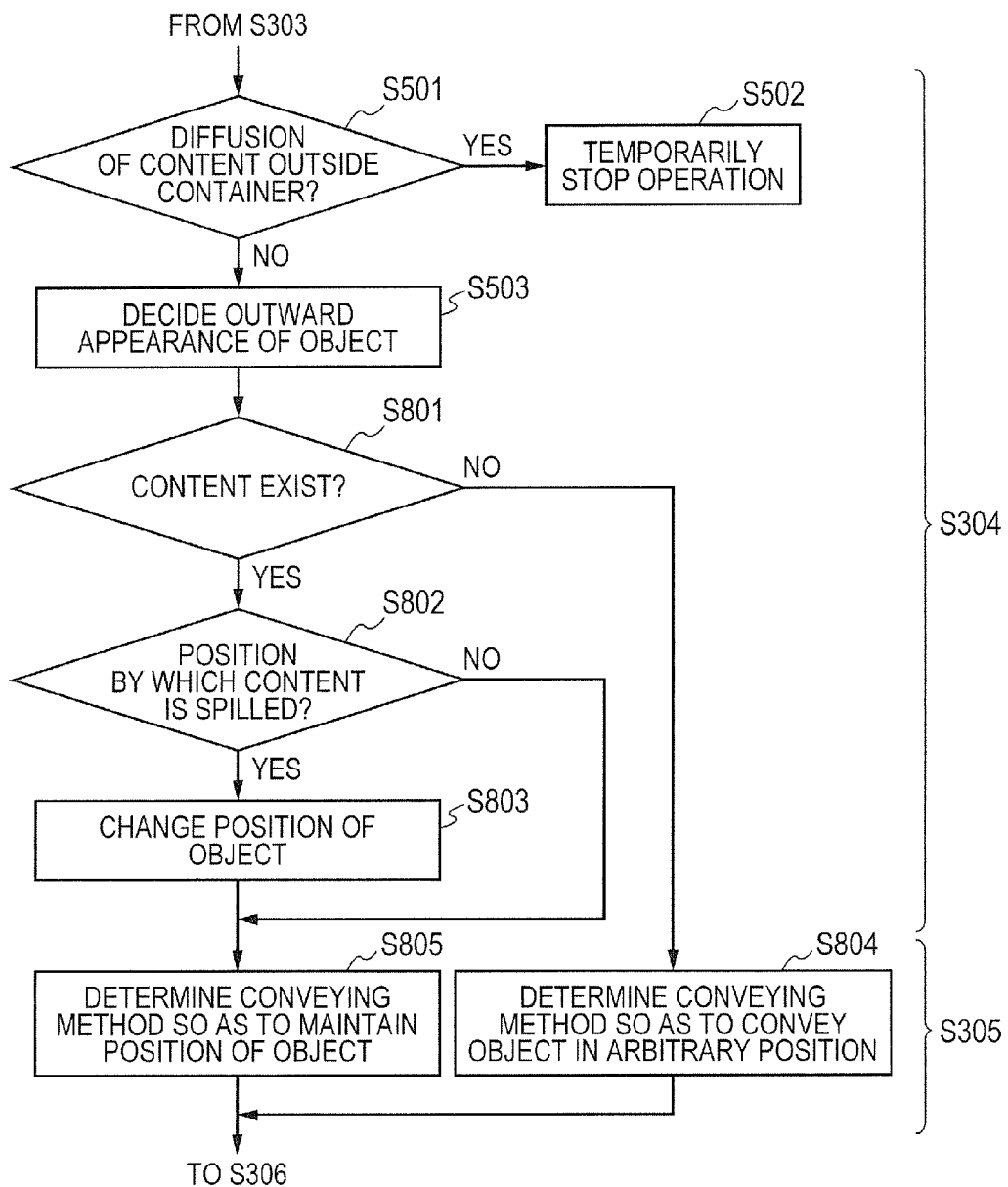
FIG. 8 is a flow chart indicating a process of the conveying system according to the fourth embodiment.

FIG. 8 is a flow chart indicating the process of the conveying system according to the present embodiment.

The process indicated by the flow chart in FIG. 8 corresponds to the state measuring process of S304 and the conveying method determining process of S305 respectively indicated in FIG. 3. Hereinafter, in the flow chart of FIG. 8, only the processes in S801 to S805 different from the process in the first embodiment will be described. Namely, the processes same as those in the first embodiment are indicated by the respective same step numbers, and the descriptions thereof will be omitted.

In S801, the state measuring unit 204 decides whether or not the content exists in the object 106. That is, based on the image information of the object 106, the state measuring unit 204 decides whether or not the content has been contained in the object 106, by referring to the table, stored in the state DB 205, showing the correspondence relation between the amount and the state of the content in the object 106. If it is decided that the content is not contained, the object content deciding process is ended, and the process is advanced to S804. On the other hand, if it is decided that the content has been contained, the process is advanced to S802.

In S802, the state measuring unit 204 decides whether or not the object 106 is in the position by which the content is spilled. In this step, based on the result of the deficiency/lack detecting process in S403, the state measuring unit decides the position by referring to the information indicating whether or not there is the hole in the object 106. Then, if it is decided that the object 106 is not in the position by which the content is spilled, the process is advanced to S805. On the other hand, if it is decided that the object 106 is in the position by which the content is spilled, the process is advanced to S803.

In S803, the action planning unit 207 changes the position of the object 106. That is, based on the decided result in S802, the action planning unit 207 changes the position of the object 106 to the position by which the content is not spilled. For example, if the object 106 is a toner cartridge in which a toner has been contained and there is a hole on the side of the toner cartridge, the position thereof is changed by turning the hole up so as to not spill the toner from the toner cartridge.

In S804, the conveying method determining unit 206 determines the conveying position (conveying attitude) of the object 106. That is, the conveying method determining unit 206 determines the conveying method so as to convey the object 106 in an arbitrary conveying position. If the object 106 is assumed as the toner cartridge, it is decided here that a toner is not contained in the toner cartridge. Therefore, even if there is a hole in the toner cartridge, it is possible to determine the conveying position of the toner cartridge so as to convey the toner cartridge irrespective of whether the hole turns up or down. After then, the conveying method determining process is ended, and the process is advanced to S306.

On the other hand, in S805, the conveying method determining unit 206 determines the conveying position of the object 106 so as to maintain the position of the object 106 by which the content is not spilled. For example, if the object 106 is the toner cartridge in which the toner has been contained, the conveying method is determined so as to maintain the conveying position by which the hole in the toner cartridge up is turned up. After then, the conveying method determining process is ended, and the process is advanced to S306.

According to the present embodiment, it is first decided whether or not the object 106 is in the position by which the content is spilled out of the container. Then, if it is decided that the object is in the position by which the content is spilled, the position of the object 106 is changed to that by which the content is not spilled. Then, the object is conveyed in the changed conveying position by which the content is not spilled. Thus, it is possible to convey the object so as to prevent the content from being diffused.

Fifth Embodiment

In the first to fourth embodiments, the object 106 is conveyed so as to prevent the diffusion of the content. In the present embodiment, a method of stopping the conveying system itself will be described. That is, in a case where the contents of the object 106 are excessively diffused outside the container, the conveying system is temporarily stopped, and the situation of the time with which the robot 101 cannot cope is notified to an operator.

Figure 9:
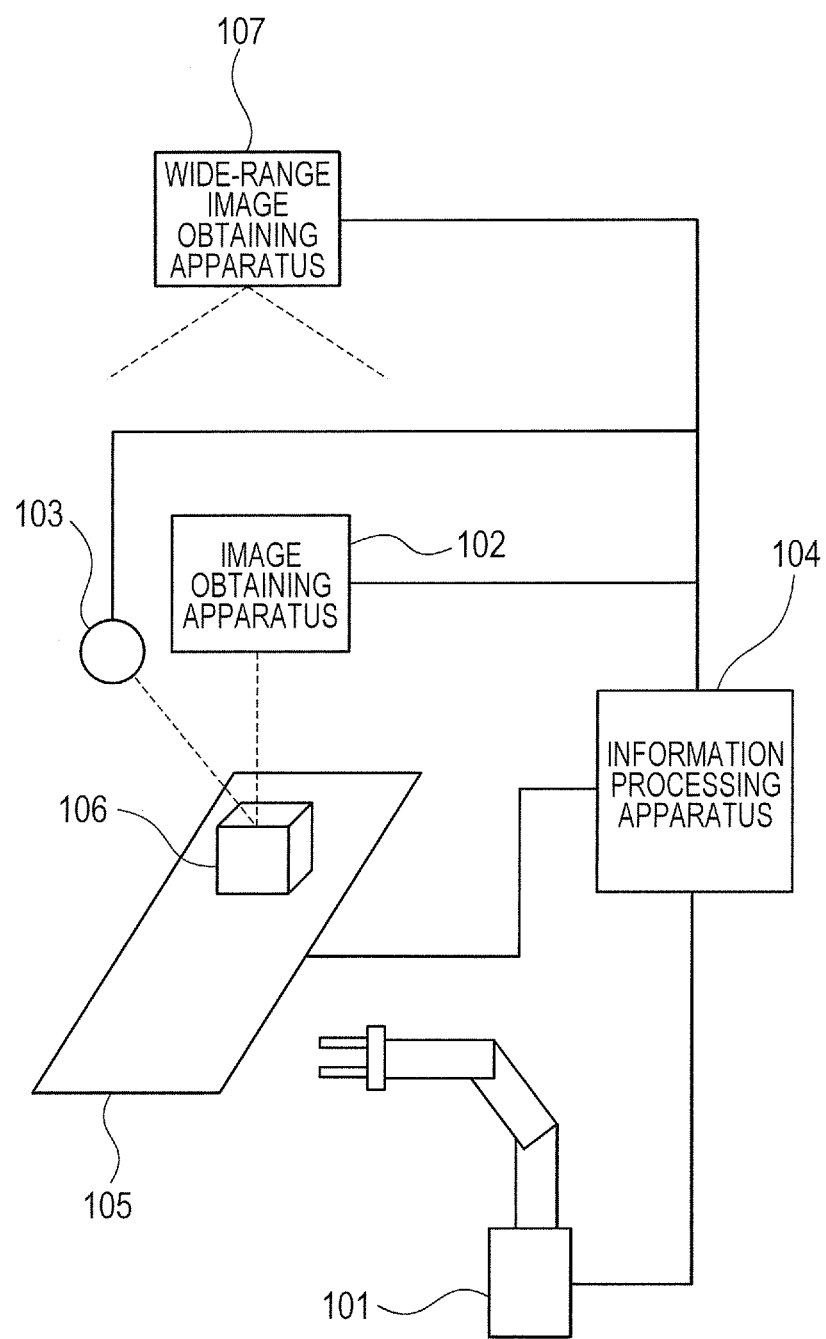
FIG. 9 is a diagram illustrating an example of the configuration of a conveying system according to the fifth embodiment.

FIG. 9 is a diagram illustrating an example of the configuration of a conveying system according to the present embodiment. In the conveying system according to the present embodiment, a wide-range image obtaining apparatus 107 is added to the configuration illustrated in FIG. 1.

As illustrated FIG. 5, the state measuring unit 204 decides in S501 whether or not there is the diffusion of the content of the object 106 outside the container. In this step, based on the image information obtained in S301, the state measuring unit 204 decides whether or not the content of the object 106 has been diffused outside the container to the extent equal to or higher than the preset state. As the image information to be used here, in addition to the image information obtained by the image obtaining apparatus 102, the image information obtained by the wide-range image obtaining apparatus 107 is used if the target range is wide. More specifically, the state measuring unit 204 decides whether or not there is the diffusion of the content outside the container, by referring to the table showing the correspondence relation between the diffusion amount and the state of the content on the periphery of the object 106 stored in the state DB 205. This process corresponds to an example of the process to be performed by a diffusion deciding unit.

Then, if it is decided that there is the diffusion of the content outside the container, the process is advanced to S502 in which the action planning unit 207 temporarily stops the operation of the conveying system.

According to the present embodiment, if the content of the object 106 has been diffused outside the container to the extent equal to or higher than the set state, the conveying system is temporarily stopped. Therefore, if the content of the object 106 is powder such as a toner, it is possible to prevent that the content is excessively diffused.

In the present embodiment, the case that also the image information obtained by the wide-range image obtaining apparatus 107 is used has been described. However, if the image obtaining apparatus 102 can obtain the image information indicating that the content has been diffused on the periphery of the object 106, the wide-range image obtaining apparatus 107 can be omitted.

Incidentally, the content to be treated in the present invention may include any physical object, matter or substance if it can be contained in the object 106. As an example of the content, the toner described in the first embodiment is used. In any case, the content is not limited to the powder such as the toner, but may be liquid.

The state of the content of the object 106 in the present invention may include any state if the amount thereof can be measured. For example, the state corresponds to the amount of the toner contained in the toner cartridge. In any case, the state is not limited to the amount of the powder such as the toner, but may be an amount of liquid.

The content adhered outside the container in the present invention may include any content if it can be contained in the object 106. As an example of the content, the toner contained in the toner cartridge is used. In any case, the content adhered outside the container is not limited to the powder such as the toner, but may be liquid.

The hole in the present invention may include any hole if it occurs in the object 106. For example, the hole occurring due to the deficiency or lack as in the fourth embodiment is used as the hole. In other words, the hole in the object 106 may be either the hole occurring due to the deficiency or the hole occurring due to the lack.

The state in the present invention may include any state if it is related to the diffusion state of the content of the object 106. For example, the diffusion state of the toner as in the fifth embodiment is used as the state. Incidentally, the diffused content is not limited to the powder such as the toner, but may be liquid.

It should be noted that the present invention is not limited to the above embodiments, modifications are possible within the scope of the present invention, and the above embodiments may appropriately be combined.

Moreover, the present invention can be achieved also by the following process. In other words, it is possible to achieve the present invention by supplying the programs for realizing the functions of the above embodiments to the conveying system or the information processing apparatus 104 via networks or various storage media and causing the computer (or the CPU, etc.) of the information processing apparatus 104 to read and execute the supplied programs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-158705, filed Aug. 4, 2014, which is hereby incorporated by reference herein in its entirety.

What is claimed is:

1. A conveying controlling apparatus which controls a conveying apparatus conveying an object container, comprising:
   a shape measuring unit configured to measure a 3D (three-dimensional) shape of the object container;
   a state measuring unit configured to measure a state of a content of the object container;
   a determining unit configured to determine a conveying method for the object container by the conveying apparatus based on the 3D shape measured by the shape measuring unit and the state measured by the state measuring unit; and
   a controlling unit configured to control an action of the conveying apparatus based on the conveying method determined by the determining unit.

2. The conveying controlling apparatus according to claim 1, further comprising a deciding unit configured to decide a deficiency or lack of the object container based on the 3D shape measured by the shape measuring unit, wherein
  in a case where it is decided by the deciding unit that there is a hole in the object container, the determining unit determines a conveying method in which the hole is covered.

3. The conveying controlling apparatus according to claim 2, further comprising a content deciding unit configured to decide whether or not the content is contained in the object container, as the state measured by the state measuring unit, wherein
  in a case where it is decided by the deciding unit that there is the hole in the object container and it is decided by the content deciding unit that the content is contained in the object container, the determining unit determines the conveying method in which the hole is covered.

4. The conveying controlling apparatus according to claim 1, further comprising a deciding unit configured to decide a deficiency or lack of the object container based on the 3D shape measured by the shape measuring unit, wherein
  in a case where it is decided by the deciding unit that there is a hole in the object container, the determining unit determines a conveying method in which the object container is in a position by which the hole is turned up.

5. The conveying controlling apparatus according to claim 1, further comprising:
  a deciding unit configured to decide a deficiency or lack of the object container based on the 3D shape measured by the shape measuring unit; and
  an amount deciding unit configured to decide an amount of the content, as the state measured by the state measuring unit, wherein
  in a case where it is decided by the deciding unit that there is the deficiency or lack in the object container, the determining unit determines conveying speed of conveying the object container according to the amount of the content decided by the amount deciding unit.

6. The conveying controlling apparatus according to claim 1, further comprising an adhesion deciding unit configured to decide whether or not the content has been adhered to an outer surface of the object container, as the state measured by the state measuring unit, wherein
  in a case where it is decided by the adhesion deciding unit that the content has been adhered, the determining unit determines a conveying method in which a diffusion of the adhered content is prevented.

7. The conveying controlling apparatus according to claim 1, further comprising a diffusion deciding unit configured to decide whether or not the content of the object container has been diffused, based on image information of a periphery of the object container, as the state measured by the state measuring unit, wherein
  in a case where it is decided by the diffusion deciding unit that the content of the object container has been diffused, the controlling unit stops conveying the object container.

8. A conveying controlling apparatus which controls a conveying apparatus conveying an object container, comprising:
  a deciding unit configured to decide whether or not there is a hole in the object container;
  a determining unit configured to, in a case where it is decided by the deciding unit that there is the hole in the object container, determine a conveying method so as to cover the hole; and
  a controlling unit configured to control an action of the conveying apparatus based on the conveying method determined by the determining unit.

9. A conveying system which comprises a conveying apparatus conveying an object container and a conveying controlling apparatus controlling the conveying apparatus, wherein:
  the conveying controlling apparatus comprises,
    a shape measuring unit configured to measure a 3D shape of the object container,
    a state measuring unit configured to measure a state of a content of the object container,
    a determining unit configured to determine a conveying method for the object container by the conveying apparatus based on the 3D shape measured by the shape measuring unit and the state measured by the state measuring unit, and
    a controlling unit configured to control an action of the conveying apparatus based on the conveying method determined by the determining unit; and
  the conveying apparatus conveys the object container by the conveying method determined by the determining unit, under the control of the controlling unit.

* * * * *